United States Patent
Hu et al.

(10) Patent No.: US 8,358,604 B2
(45) Date of Patent: Jan. 22, 2013

(54) METHOD AND APPARATUS FOR FACILITATING CELL DETECTION USING ADDITIONAL PHYSICAL CHANNELS IN A WIRELESS COMMUNICATION SYSTEM

(75) Inventors: An-swol C. Hu, San Diego, CA (US); Jittra Jootar, San Diego, CA (US); Parvathanathan Subrahmanya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 12/646,286

(22) Filed: Dec. 23, 2009

(65) Prior Publication Data

US 2011/0149757 A1    Jun. 23, 2011

(51) Int. Cl.
   *H04B 7/00*    (2006.01)
(52) U.S. Cl. ............... 370/310; 370/252; 370/342
(58) Field of Classification Search .......... 370/252, 370/254, 236, 310, 336, 317, 331, 324, 332, 370/329, 328, 342, 464, 479; 375/211, 147, 375/148, 144, 367, 130, 326, 145, 260; 455/65, 455/226.2, 226.3, 334, 512
See application file for complete search history.

(56) References Cited

U.S. PATENT DOCUMENTS

| | | | | |
|---|---|---|---|---|
| 5,805,648 A * | 9/1998 | Sutton | ............................ | 375/367 |
| 6,597,729 B1 | 7/2003 | Schmidl et al. | | |
| 6,792,276 B1 * | 9/2004 | Butovitsch et al. | ............ | 455/453 |
| 6,822,999 B1 * | 11/2004 | Lee et al. | ....................... | 375/145 |
| 8,130,145 B2 * | 3/2012 | Simic et al. | ............... | 342/357.76 |
| 2003/0043768 A1 * | 3/2003 | Chang et al. | .................... | 370/335 |
| 2003/0095516 A1 * | 5/2003 | Ok et al. | ........................ | 370/331 |
| 2004/0196893 A1 * | 10/2004 | Oh et al. | ........................ | 375/148 |
| 2005/0147157 A1 * | 7/2005 | Chen et al. | ..................... | 375/150 |
| 2005/0243898 A1 * | 11/2005 | Reznik et al. | ..................... | 375/147 |
| 2005/0276314 A1 * | 12/2005 | Dateki et al. | ................... | 375/148 |
| 2008/0107215 A1 * | 5/2008 | Nibe | .............................. | 375/346 |
| 2008/0212654 A1 * | 9/2008 | Nilsson et al. | ................. | 375/147 |
| 2010/0054131 A1 * | 3/2010 | Del Rio Herrero et al. | .. | 370/236 |
| 2011/0007644 A1 * | 1/2011 | Walker | ............................ | 370/252 |
| 2011/0021171 A1 * | 1/2011 | Sturza et al. | ................... | 455/334 |

FOREIGN PATENT DOCUMENTS

EP    1748571 A2    1/2007

OTHER PUBLICATIONS

International Search Report and Written Opinion—PCT/US2010/061159—ISA/EPO—Mar. 16, 2011.

\* cited by examiner

*Primary Examiner* — Abdullah Riyami
(74) *Attorney, Agent, or Firm* — Jeffrey D. Jacobs

(57) ABSTRACT

The described apparatus and methods may include a receiver configured to receive a signal, the signal being a combination of physical channel signals that each correspond to a different one of a plurality of physical channels, and a controller configured to capture signal energy from at least two of the physical channel signals, and detect a cell based on the captured signal energy.

36 Claims, 6 Drawing Sheets

METHOD AND APPARATUS FOR FACILITATING CELL DETECTION USING ADDITIONAL PHYSICAL CHANNELS IN A WIRELESS COMMUNICATION SYSTEM

BACKGROUND

1. Field

The present disclosure relates generally to wireless communication systems. More specifically, the present disclosure relates to a method and apparatus for facilitating cell detection using additional physical channels in a wireless communication system.

2. Introduction

Wireless communication systems are widely deployed to provide various communication services such as voice, video, packet data, messaging, broadcast, etc. These systems may be multiple-access systems capable of supporting communication with multiple users by sharing the available system resources (e.g., bandwidth and transmit power). Examples of such multiple-access systems include Code Division Multiple Access (CDMA) systems, Universal Mobile Telecommunications System (UMTS) Wideband CDMA (WCDMA) systems, Time Division Multiple Access (TDMA) systems, Frequency Division Multiple Access (FDMA) systems, 3GPP Long Term Evolution (LTE) systems, orthogonal Frequency Division Multiple Access (OFDMA) systems, and Single-Carrier FDMA (SC-FDMA) systems.

In a wireless communication system, pilot signals are often broadcasted by base stations to serve as beacons for access terminals in search of a cell. In order to detect the pilot signals in a WCDMA system, access terminals may, for example, perform either a Three-Step search or a pseudorandom noise (PN) search to detect a pilot signal. Both of these searches may be carried out using a set of integration parameters, such as a coherent integration length Nc and a non-coherent integration length Nn. Typically, the values of the integration parameters depend in part on the configuration of the access terminal and may have a significant effect on the probability of detecting a cell. An increase in the probability of cell detection is desirable, as it may allow an access terminal to more quickly and effectively locate and access the best available cell, resulting in better signal transmission and reception, often at reduced transmission power levels by both the base station and the access terminal.

Accordingly, there exists a need in the art for a method and apparatus for facilitating detection of cells in a wireless communication system by optimizing the search integration parameters and utilizing additional physical channels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a wireless communication apparatus may include a receiver configured to receive a signal, the signal being a combination of physical channel signals that each correspond to a different one of a plurality of physical channels, and a controller configured to capture signal energy from at least two of the physical channel signals, and detect a cell based on the captured signal energy.

According to another aspect of the disclosure, a method for communication may include receiving a signal, the signal being a combination of physical channel signals that each correspond to a different one of a plurality of physical channels, capturing signal energy from at least two of the physical channel signals, and detecting a cell based on the captured signal energy.

According to a further aspect of the disclosure, an apparatus for wireless communication may include means for receiving a signal, the signal being a combination of physical channel signals that each correspond to a different one of a plurality of physical channels, means for capturing signal energy from at least two of the physical channel signals, and means for detecting a cell based on the captured signal energy.

According to yet a further aspect of the disclosure, a computer program product may include a computer-readable medium including code for receiving a signal, the signal being a combination of physical channel signals that each correspond to a different one of a plurality of physical channels, code for capturing signal energy from at least two of the physical channel signals, and code for detecting a cell based on the captured signal energy.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
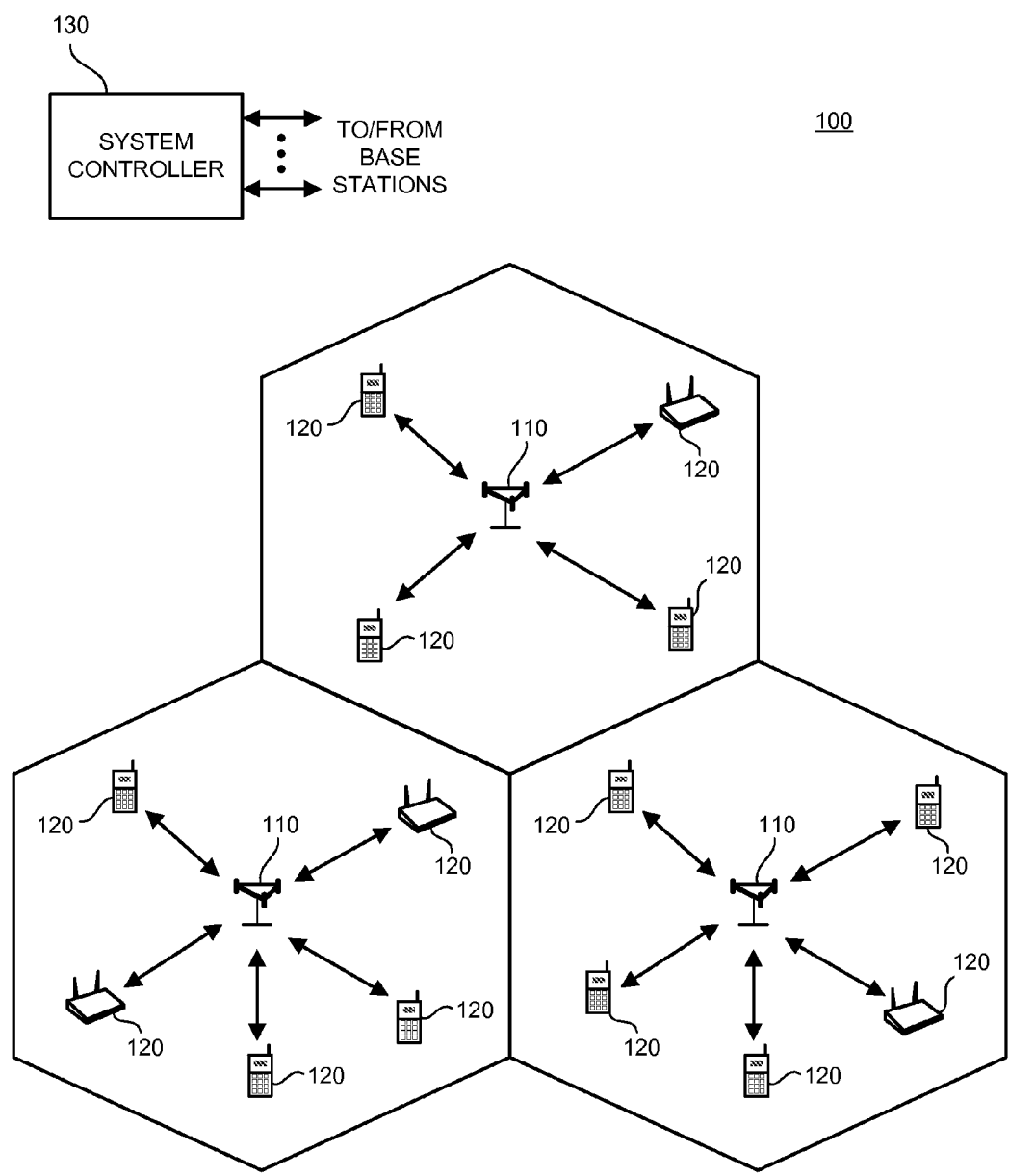
FIG. 1 illustrates aspects of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system," "apparatus" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, WCDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

FIG. 1 shows a wireless communication system 100, which may be a WCDMA system. System 100 may include base stations 110 and other network entities. A base station may be a fixed station that communicates with the access terminals. Each base station 110 may provide communication coverage for a particular geographic area. To improve network capacity, the overall coverage area of a base station may be partitioned into multiple (e.g., three) smaller areas. Each smaller area may be served by a respective base station subsystem. A "cell" can refer to the smallest coverage area of a base station and/or a base station subsystem serving this coverage area.

A system controller 130 may include a mobility management entity (MME) and a serving gateway (S-GW), and may couple to a set of base stations and provide coordination and control for these base stations. S-GW may support data services such as packet data, Voice-over-Internet Protocol (VoIP), video, messaging, etc. MME may be responsible for path switching between a source base station and a target base station at handover. System controller 130 may couple to a core and/or data network (e.g., the Internet) and may communicate with other entities (e.g., remote servers and terminals) coupled to the core/data network.

Access terminals 120 may be dispersed throughout the network, and each access terminal may be stationary or mobile. An access terminal may communicate with a base station via downlink and uplink. The downlink (or forward link) refers to the communication link from the base station to the access terminal, and the uplink (or reverse link) refers to the communication link from the access terminal to the base station. In FIG. 1, a solid line with double arrows indicates active communication between a base station and an access terminal.

Figure 2:
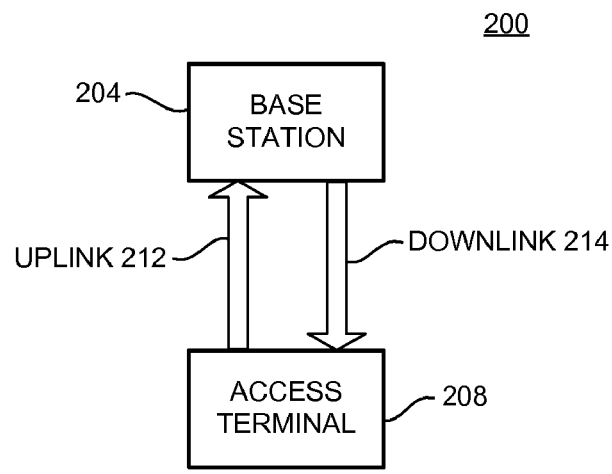
FIG. 2 illustrates a communications system including an uplink and a downlink between a base station and an access terminal.

FIG. 2 illustrates a system 200 including an uplink 212 and a downlink 214 between a base station 204 and an access terminal 208. The base station 204 and the access terminal 208 may correspond to the base station 110 and the access terminal 120 shown in FIG. 1. The uplink 212 refers to transmissions from the access terminal 208 to the base station 204; and the downlink 214 refers to transmissions from the base station 204 to the access terminal 208.

Figure 3:
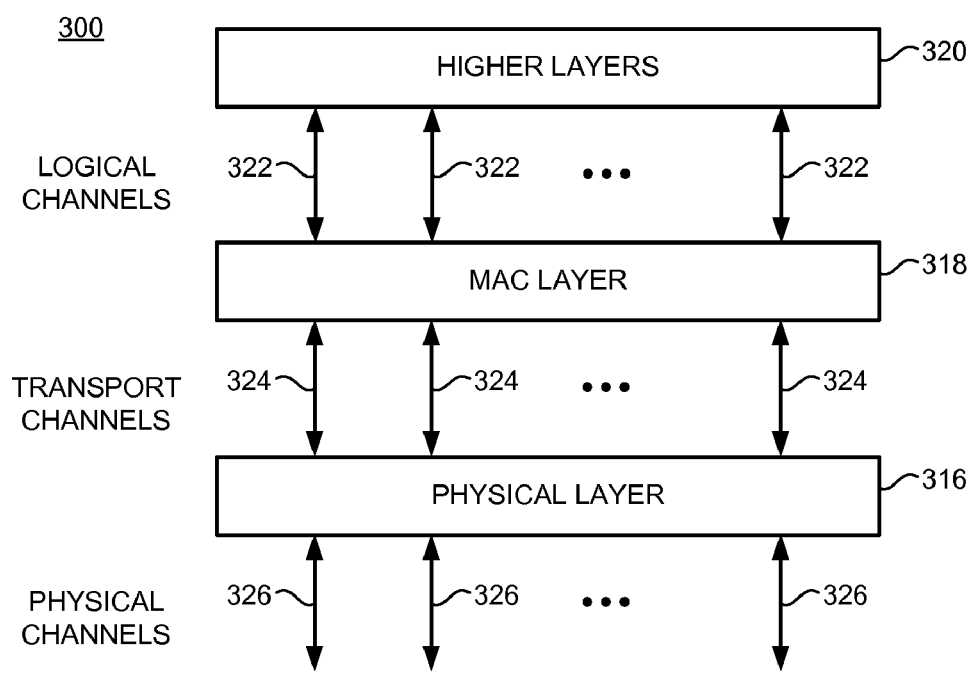
FIG. 3 illustrates some aspects of a protocol stack for a communications system.

FIG. 3 illustrates some aspects of a protocol stack for a communications system. Both, the base station 204 and the access terminal 208 may include the protocol stack 300 illustrated in FIG. 3. The protocol stack may include a physical layer (PHY) 316, a Medium Access Control (MAC) 318, and higher layers 320 (e.g., radio link control (RLC) layer, radio resource control (RRC) layer, etc.).

The MAC layer 318 may determine how different types of information coming from the higher layers over different logical channels 322 should be transmitted over a physical channel 326 on a radio frame, and may control the timing of those transmissions. It may provide the following services to the upper layers: data transfer, reallocation of radio resources and redefinition of MAC parameters, measurement of the traffic volume and signal quality, and reporting of the results to the RRC layer.

The physical layer 316 may be configured to provide multiple physical control channels 326. The purpose of the physical layer 316 is to condition the digital data from higher layers so that it can be transmitted over a mobile radio channel reliably. In the transmit direction, the physical layer 316 may perform such functions as channel coding, interleaving, scrambling, spreading, and modulation. In the receive direction, these functions are reversed so that the transmitted data is recovered at the receiver. The MAC layer 318 delivers user data and signaling over a number of the transport channels 324.

Some of the physical channels for downlink signal transmissions, such as those in a WCDMA system, may be Common Pilot Channel (CPICH), Synchronization Channel (SCH), Primary Common Control Physical Channel (PCCPCH), Secondary Common Control Physical Channel (SCCPCH), Acquisition Indicator Channel (AICH), and Paging Indicator Channel (PICH). Some of the physical channels for uplink signal transmissions, such as those in a WCDMA system, may be Dedicated Physical Data Channel (DPDCH), Dedicated Physical Control Channel (DPCCH), and Physical Random Access Channel (PRACH).

In WCDMA, the signal may be spread in two steps. First, all physical channels with the exception of the SCH are spread by unique channelization codes so that they can be separated at the receiver of the access terminal. The spreading factor is defined as the number of chip periods into which each incoming symbol is spread. The chosen channelization codes are mutually orthogonal and may spread each physical channel by a variable spreading factor. As such, the codes are known as Orthogonal Variable Spreading Factors (OVSF). In the second step, the physical channels thus spread are summed together and scrambled by unique, complex-valued scrambling codes so that the source of the physical channels, such as different access terminals in a cell or various sectors of a cell, can be unambiguously identified at the receiver of the access terminal.

Figure 4:
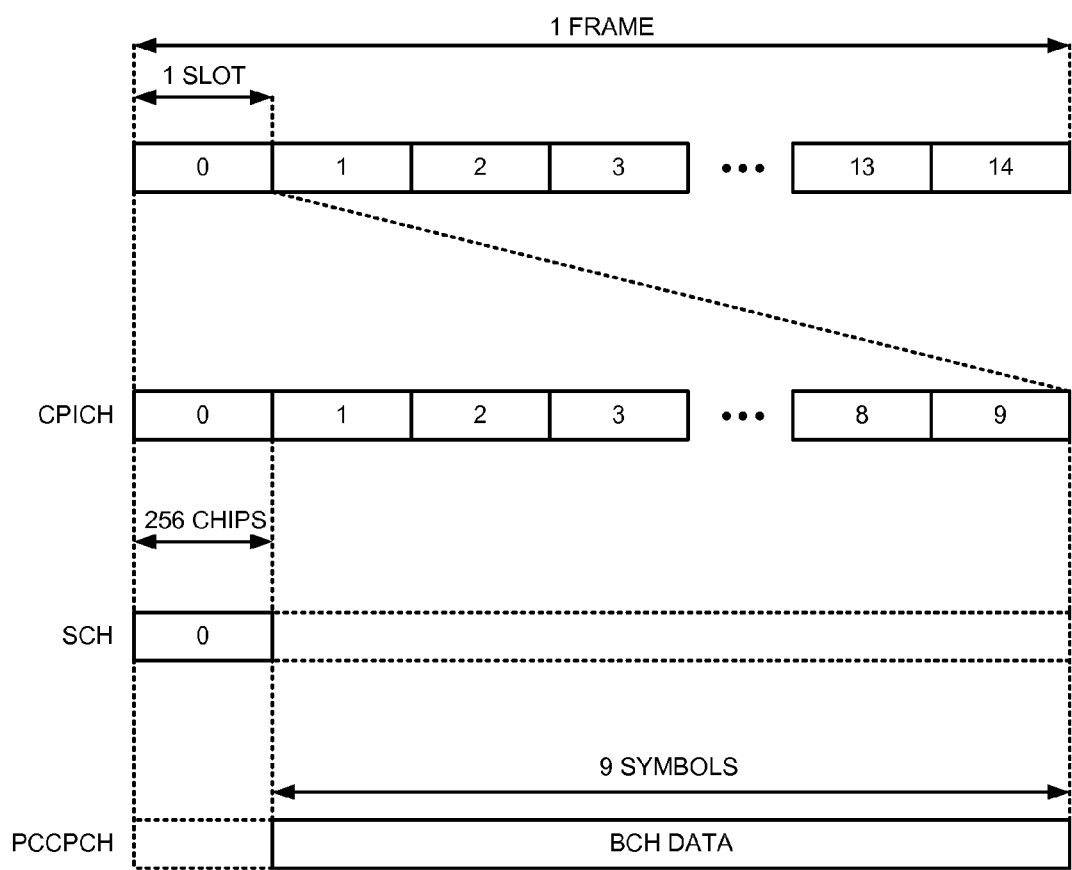
FIG. 4 illustrates a downlink physical channel format that is handled in a cell search in a WCDMA communication system.

FIG. 4 illustrates a downlink physical channel format that is handled in a cell search in a WCDMA system. As shown in FIG. 4, transmitted data may include units of 10 ms frames. Each frame may include fifteen slots. Each slot may hold ten symbols, each of 256 chips. Hence, each slot may be 2560 chips in length. It should be noted, however, that a 256 chip symbol may apply only to certain channels that are spread using a spreading factor of 256 (e.g., CPICH, PCCPCH, etc.). Depending on the spreading factor, symbols may have a different number of chips.

The two types of physical channels that may be used in a cell search are SCH and CPICH. PCCPCH may be used in acquiring a cell. However, as will be described in further detail below, PCCPCH may also be used to search for cells when capturing at least a portion of its energy. CPICH transmits a predefined symbol sequence (i.e., pilot signal) that can be used by the receiver of the access terminal to estimate various channel parameters. There may be two types of pilot channels—a primary pilot channel and a secondary pilot channel. The primary pilot channel may employ a fixed channelizaton code and a primary scrambling code. Each cell is assigned only one primary common pilot channel, which is transmitted over the entire cell. The secondary channel, on the other hand, may use any channelization code of length 256 and a primary or secondary scrambling code and may be used over an entire cell or part of a cell. PCCPCH may be used to transmit the Broadcast Channel (BCH) in order to identify the transmitting base station to the access terminals within the cell, and may be transmitted over the entire cell.

It should be noted that CPICH (i.e., primary CPICH) channelization code is typically fixed at $C_{ch,256,0}$ while the PCCPCH channelization code is fixed to $C_{ch,256,1}$, where 256 is the spreading factor, and 0 and 1 represent the code number.

As shown in FIG. 4, CPICH contains 10 symbols per slot. For SCH and PCCPCH, on the other hand, the first 256 chips are assigned to SCH, and the remaining space of 9 symbols is assigned to PCCPCH.

SCH is the channel that may be used by access terminals for initial cell search. SCH may be made up of a combination of Primary SCH (PSCH) and Secondary SCH (SSCH). The PSCH and SSCH are orthogonal to each other, and thus, can be broadcast on top of each other. Of these, PSCH may be coded with the Primary Synchronization Code, which is a code used in common by all base stations and all slots. The SSCH may consist of a transmitted sequence of 15 codes each of 256 chips in length. The sequence of 15 codes repeats every frame (15 slots). In any given slot, the Secondary Synchronization Code on the SSCH may be transmitted in parallel with PSCH. Each secondary synchronization code in a given slot is chosen from a set of 16 different codes each of 256 chips in length. The sequence of the 15 secondary synchronization codes over one frame indicates to which code group the cell's downlink scrambling code belongs.

The primary CPICH may be broadcast with the SCH and PCCPCH. The coding used for the CPICH may be unique to the broadcasting base station. A base station may use one of 512 different primary scrambling codes (PSC) for the CPICH, which are broken into 64 code groups, each having 8 respective codes. The primary synchronization code of the PSCH is common across all base stations, and can thus be used for slot synchronization. Although the secondary synchronization codes of the SSCH may change on a slot by slot basis, the sequence of the secondary synchronization codes on the SSCH may be determined by the code group into which the code used for the CPICH lies. That is, there may be 64 code sequence patterns for the SSCH to follow, each of which corresponds to a particular code group associated with the code used for the CPICH. As well, since the SSCH code sequences can not be time shifted versions of each other, determining the code sequence also identifies the first code in the sequence and, hence, the start of the frame. By correlating the received signal with all possible SSCH code sequences and identifying the maximum correlation value, it is possible to learn the code group of the CPICH, and to obtain frame synchronization. Once the code group and frame timing of the CPICH is learned, it may be possible to obtain the primary scrambling code used by the cell by performing correlation over the CPICH with all eight of the codes in the code group identified for the CPICH. Once the primary scrambling code used by the base station has been identified, system and cell specific broadcast channel (BCH) information can be read.

A Three-Step cell search may thus be broken down into the following three steps: step one—identifying the slot timing, step two—achieving frame synchronization and determining the code group, and step three—finding the exact primary scrambling code used in the desired cell.

Because the primary synchronization code is the same for all cells in a system and is transmitted in every slot on the primary synchronization channel, the slot boundaries can be determined by correlating time shifted versions of the PSC with the incoming signal and detecting peaks.

To identify the frame boundary and code group, the received signal may be correlated with each of the 64 secondary code sequences at each of the 15 possible frame timing hypotheses. The maximum correlator output provides the frame synchronization and code group.

The last step is concerned with the determination of the PSC. Because the CPICH is scrambled with the PSC, the PSC can be determined by correlating the received signal with all codes within the code group determined in the second step. After having found the scrambling code, it may now be possible to detect the PCCPCH that maps the BCH.

Alternatively, if the scrambling code is already known, a Pseudorandom Noise (PN) search may be used to determine a path profile of a given cell, as well as to track the cell.

For example, a received signal y[k] may be represented by the following equation, where s[k] is the scrambling code, a[k] is the fading, and n[k] is the complex independent and identically distributed Gaussian noise, $O_{256,0}[k]$ is the orthogonal variable spreading factor (OVSF) sequence $C_{ch,256,0}$, and $O_{256,1}[k]$ is the OVSF sequence $C_{ch,256,1}$.

$$y[k] = (\sqrt{E_{CPICH}} o_{256,0}[k] + \sqrt{E_{PCCPCH}} b_{PCCPCH} o_{256,1}[k] + \text{others}) s[k] a[k] e^{j\theta} + \sqrt{E_n} n[k]$$

In accordance with an aspect, an energy metric E(i,l) that may be used in the step three or PN search is represented by the following equation, where Nc is the coherent integration length and is equal to 128, Nn is the non-coherent integration length and may be set to any suitable number (e.g., 24, 36, a number in a range from 16 to 36, or any other appropriate number), i is the scrambling code index, and/is the search window position.

$$E(i, l) = \sum_{j=0}^{Nn'-1} \left| \sum_{k=jNc'}^{(j+1)Nc'-1} y[k+l] o_{128,0}[k] s_i^*[k] \right|^2$$

For a "step 3" search, the correct scrambling code index i may be chosen from the code group found in the second step, and the exact frame timing/may be chosen from over a window around the frame timing position found in the second step as arg $\max_{i,l}$ E(i,l). For a PN search, the scrambling code i may be fixed, and the path positions may be chosen as the l values that provide the strongest energies E(i,l).

By using a coherent integration length Nc of 128, as opposed to 256, it may be possible to capture energy from both the CPICH and the PCCPCH. Capturing energy on a plurality of physical channels may increase the probability of detection of a cell, especially during instances of high frequency error.

Figure 5:
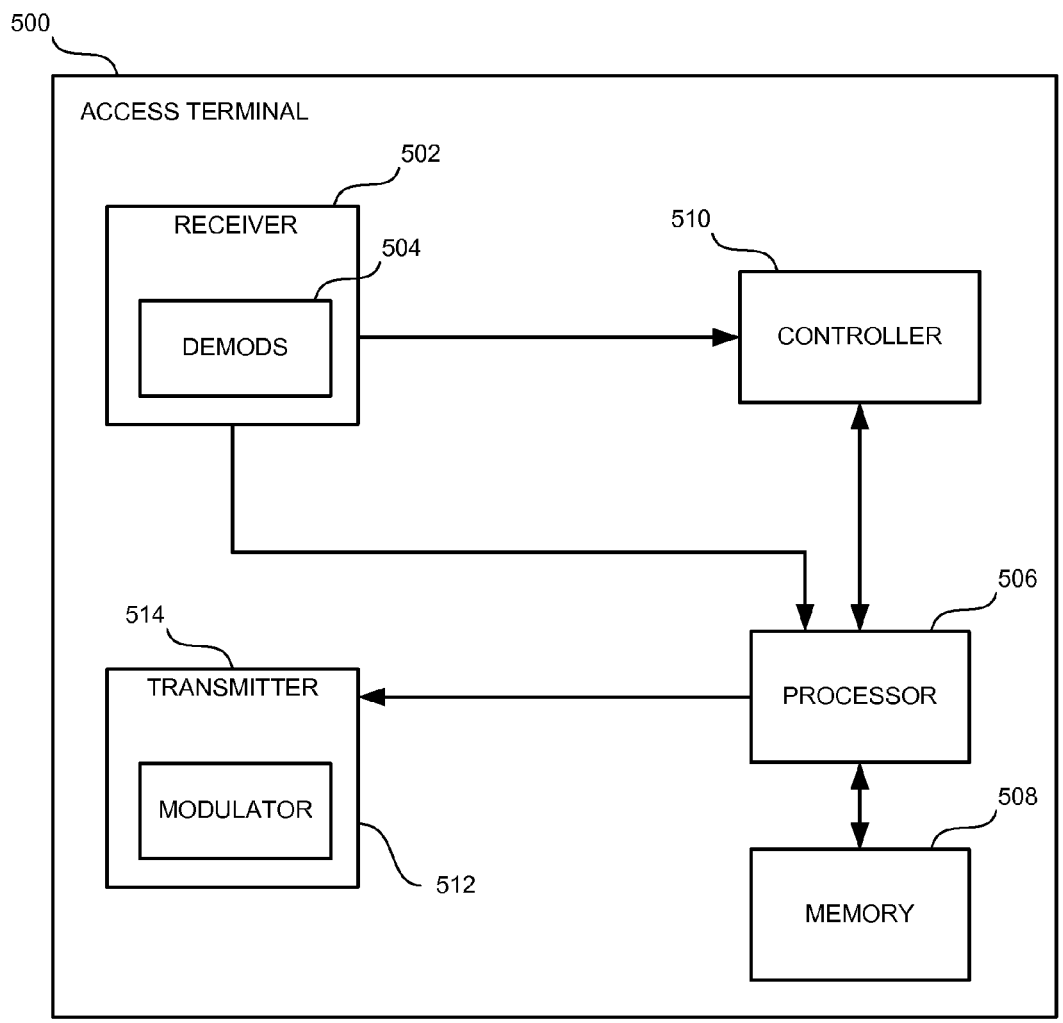
FIG. 5 illustrates an example of an access terminal that facilitates detection of cells in a wireless communication system.

FIG. 5 is an illustration of an access terminal that is capable of facilitating detection of cells in a wireless communication system. The access terminal 500 may correspond to the access terminal 120 shown in FIG. 1. As shown in FIG. 5, the access terminal 500 may include a receiver 502 that receives multiple signals from, for instance, one or more receive antennas (not shown), performs typical actions on (e.g., filters, amplifies, downconverts, etc.) the received signals, and digitizes the conditioned signals to obtain samples. The receiver 502 may be configured to be able to communicate within various networks, such as WAN, LAN, and PAN. The receiver 502 may be a single receiver, as shown, or include multiple receivers for each separate communication protocol. The receiver 502 may also include a plurality of demodulators 504 that can demodulate received symbols from each signal and provide them to a processor 506. The processor 506 can be a processor dedicated to analyzing information received by the receiver 502 and/or generating information for transmission by a transmitter 514, a processor that controls one or more components of the access terminal 500, and/or a processor that both analyzes information received by the receiver 502, generates information for transmission by the transmitter 514, and controls one or more components of the access terminal 500.

The access terminal 500 may additionally include memory 508 that is operatively coupled to the processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.).

It will be appreciated that the data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 508 of the subject systems and methods is intended to comprise, without being limited to, these and any other suitable types of memory.

The receiver 502 can further be operatively coupled to a controller 510 that can receive a signal, where the signal may be a combination of physical channel signals that each correspond to a different one of a plurality of physical channels (e.g., CPICH, PCCPCH, etc.), capture signal energy from at least two of the physical channel signals by performing signal integration with a coherent integration parameter, and detect a cell based on the captured signal energy. The controller 510 can further control the acquisition and storage in memory 508 of the integration procedure, and direct communications with base stations, and devices on other networks, by interfacing with transmitter 514 via the processor 506, as discussed with reference to FIG. 1. The transmitter 514 may further be configured to communicate within various networks, such as WAN, LAN, and PAN. The transmitter 514 may be a single transmitter, as shown, or include multiple transmitters for each separate communication protocol.

Furthermore, the transmitter 514 and the receiver 502, although shown as separate components, may be integrated into a single component, such as a transceiver. The transceiver may retain all of the functions of the receiver 502 and transmitter 514, and as such, may be configured to transmit and receive signals within various networks, such as WAN, LAN, and PAN. The transceiver may also be either a single integrated transceiver capable of multi-protocol communication, or include multiple separate transceivers for each respective communication protocol.

The access terminal 500 still further comprises a modulator 512 that modulates and transmits signals via transmitter 514 to, for instance, a satellite, a base station, a web/internet access point name (APN), and another access terminal, etc. Although depicted as being separate from the processor 506, it is to be appreciated that the controller 510, demodulators 504, and/or modulator 512 can be part of the processor 506 or multiple processors (not shown). Furthermore, the functions of the controller 510 may be integrated in an application layer, a data stack, an HTTP stack, at the operating system (OS) level, in an internet browser application, or in an application specific integrated circuit (ASIC).

Figure 6:
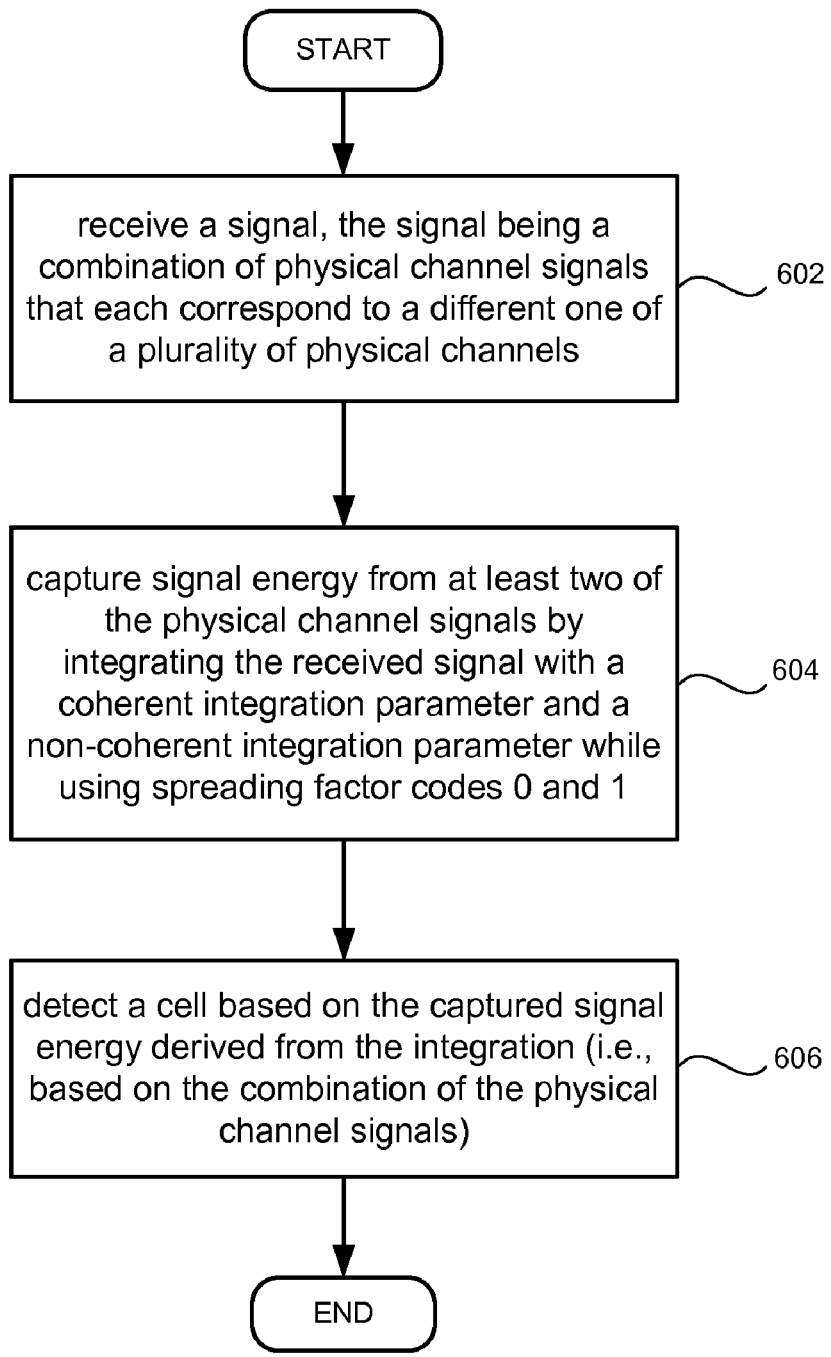
FIG. 6 is a flow chart illustrating an example of a process for facilitating detection of cells in a wireless communication system.

FIG. 6 is a flow chart illustrating an example of a process for facilitating detection of cells in a wireless communication system. The process may be implemented in the access terminal 500. As shown in FIG. 6, in block 602, a signal may be received, which may be a combination of physical channel signals that each correspond to a different one of a plurality of physical channels (e.g., CPICH, PCCPCH, etc.), and the process may proceed to block 604.

In block 604, signal energy may be captured from at least two of the physical channel signals by integrating the received signal with a coherent integration parameter (e.g., 128) and a non-coherent integration parameter (e.g., 36) while using spreading factor codes 0 and 1. Thereafter, the process may proceed to block 606.

In block 606, a cell may be detected based on the captured signal energy derived from the integration (i.e., based on the combination of the physical channel signals). For example, the controller 510 may determine that the energy captured from the physical channel signals is greater than or equal to a predetermined energy threshold for the signal to constitute a detection of a cell. The controller 510 may then establish communication with the detected cell. Thereafter, the process may end.

Figure 7:
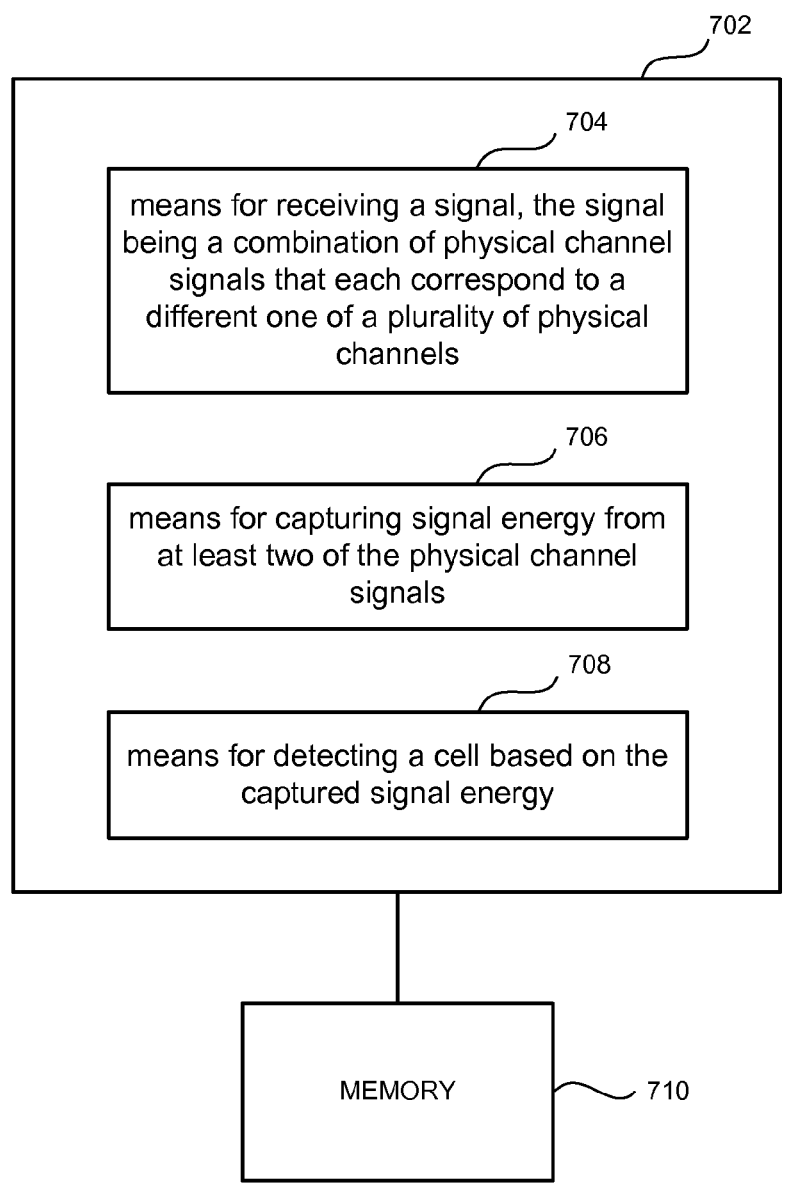
FIG. 7 is an illustration of an example system that facilitates detection of cells in a wireless communication system.

FIG. 7 is an illustration of an example system 700 that facilitates detection of cells in a wireless communication system. For example, system 700 can reside at least partially within an access terminal, etc. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include: means for receiving a signal, the signal being a combination of physical channel signals that each correspond to a different one of a plurality of physical channels 704; means for capturing signal energy from at least two of the physical channel signals 706; and means for detecting a cell based on the captured signal energy 708. Additionally, system 700 can include a memory 710 that retains instructions for executing functions associated with the means 704 through 708. While shown as being external to memory 710, it is to be understood that one or more of the means 704 through 708 can exist within memory 710.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless communication apparatus, comprising:
a receiver configured to receive a signal, the signal being a combination of physical channel signals that each correspond to a different one of a plurality of physical channels; and
a controller configured to capture signal energy from at least two of the physical channel signals, the controller further configured to integrate the received signal with a non-coherent integration parameter having a length greater than or equal to 16 and less than or equal to 36, and detect a cell based on the captured signal energy; wherein the controller is further configured to integrate the received signal with a coherent integration parameter having a length of 128.

2. The wireless communication apparatus of claim 1, wherein the controller is further configured to detect the cell based on the integration.

3. The wireless communication apparatus of claim 1, wherein the at least two of the physical channel signals are spread by a channelization code having a spreading factor of 256.

4. The wireless communication apparatus of claim 3, wherein the plurality of physical channels includes a first channel configured to carry a predefined symbol sequence.

5. The wireless communication apparatus of claim 4, wherein the first channel configured to carry the predefined symbol sequence is a pilot signal.

6. The wireless communication apparatus of claim 5, wherein the plurality of physical channels further includes a channel configured to broadcast an identity of a base station.

7. The wireless communication apparatus of claim 6, wherein the controller is further configured to capture the signal energy from the at least two of the physical channel signals using codes 0 and 1 of the spreading factor.

8. The wireless communication apparatus of claim 7, wherein the controller is further configured to determine whether the cell has been detected based on the combination of the physical channel signals.

9. A wireless communication apparatus, comprising:
a receiver configured to receive a signal, the signal being a combination of physical channel signals that each correspond to a different one of a plurality of physical channels; and
a controller configured to capture signal energy from at least two of the physical channel signals, and detect a cell based on the captured signal energy;
wherein the controller is further configured to integrate the received signal with a coherent integration parameter having a length of 128, and to integrate the received signal with a non-coherent integration parameter, wherein the non-coherent integration parameter has a length of 36.

10. A method for wireless communication, comprising:
receiving a signal, the signal being a combination of physical channel signals that each correspond to a different one of a plurality of physical channels;
capturing signal energy from at least two of the physical channel signals, by integrating the received signal with a non-coherent integration parameter having a length greater than or equal to 16 and less than or equal to 36; and detecting a cell based on the captured signal energy; wherein the capturing further comprises integrating the received signal with a coherent integration parameter having a length of 128.

11. The method of claim 10, wherein the detecting further comprises detecting the cell based on the integration.

12. The method of claim 10, wherein the at least two of the physical channel signals are spread by a channelization code having a spreading factor of 256.

13. The method of claim 12, wherein the plurality of physical channels includes a first channel configured to carry a predefined symbol sequence.

14. The method of claim 13, wherein the first channel configured to carry the predefined symbol sequence is a pilot signal.

15. The method of claim 14, wherein the plurality of physical channels further includes a channel configured to broadcast an identity of a base station.

16. The method of claim 15, wherein capturing the signal energy from the at least two of the physical channel signals further comprises capturing the signal energy using codes 0 and 1 of the spreading factor.

17. The method of claim 16, further comprising determining whether the cell has been detected based on the combination of the physical channel signals.

18. A method for wireless communication, comprising:
receiving a signal, the signal being a combination of physical channel signals that each correspond to a different one of a plurality of physical channels;
capturing signal energy from at least two of the physical channel signals; and
detecting a cell based on the captured signal energy;
wherein the capturing further comprises integrating the received signal with a coherent integration parameter having a length of 128, and integrating the received signal with a non-coherent integration parameter, wherein the non-coherent integration parameter has a length of 36.

19. An apparatus for wireless communication comprising:
means for receiving a signal, the signal being a combination of physical channel signals that each correspond to a different one of a plurality of physical channels;
means for capturing signal energy from at least two of the physical channel signals by integrating the received signal with a non-coherent integration parameter having a length greater than or equal to 16 and less than or equal to 36;
means for integrating the received signal with a coherent integration parameter having a length of 128; and
means for detecting a cell based on the captured signal energy.

20. The apparatus of claim 19, further comprising means for detecting the cell based on the integration.

21. The apparatus of claim 19, wherein the at least two of the physical channel signals are spread by a channelization code having a spreading factor of 256.

22. The apparatus of claim 21, wherein the plurality of physical channels includes a first channel configured to carry a predefined symbol sequence.

23. The apparatus of claim 22, wherein the first channel configured to carry the predefined symbol sequence is a pilot signal.

24. The apparatus of claim 23, wherein the plurality of physical channels further includes a channel configured to broadcast an identity of a base station.

25. The apparatus of claim 24, further comprising means for capturing the signal energy using codes 0 and 1 of the spreading factor.

26. The apparatus of claim 25, further comprising means for determining whether the cell has been detected based on the combination of the physical channel signals.

27. An apparatus for wireless communication comprising:
means for receiving a signal, the signal being a combination of physical channel signals that each correspond to a different one of a plurality of physical channels;
means for capturing signal energy from at least two of the physical channel signals;
means for detecting a cell based on the captured signal energy;
means for integrating the received signal with a coherent integration parameter having a length of 128; and
means for integrating the received signal with a non-coherent integration parameter;
wherein the non-coherent integration parameter has a length of 36.

28. A computer program product, comprising:
a non-transitory computer-readable medium comprising:
code for receiving a signal, the signal being a combination of physical channel signals that each correspond to a different one of a plurality of physical channels;
code for capturing signal energy from at least two of the physical channel signals by integrating the received signal with a non-coherent integration parameter having a length greater than or equal to 16 and less than or equal to 36;
code for integrating the received signal with a coherent integration parameter having a length of 128; and
code for detecting a cell based on the captured signal energy.

29. The computer program product of claim 28, wherein the non-transitory computer-readable medium further comprises code for detecting the cell based on the integration.

30. The computer program product of claim 28, wherein the at least two of the physical channel signals are spread by a channelization code having a spreading factor of 256.

31. The computer program product of claim 30, wherein the plurality of physical channels includes a first channel configured to carry a predefined symbol sequence.

32. The computer program product of claim 31, wherein the first channel configured to carry the predefined symbol sequence is a pilot signal.

33. The computer program product of claim 32, wherein the plurality of physical channels further includes a channel configured to broadcast an identity of a base station.

34. The computer program product of claim 33, wherein the non-transitory computer-readable medium further comprises code for capturing the signal energy using codes 0 and 1 of the spreading factor.

35. The computer program product of claim 34, wherein the non-transitory computer-readable medium further comprises code for determining whether the cell has been detected based on the combination of the physical channel signals.

36. A computer program product, comprising:
a non-transitory computer-readable medium comprising:
code for receiving a signal, the signal being a combination of physical channel signals that each correspond to a different one of a plurality of physical channels;
code for capturing signal energy from at least two of the physical channel signals;
code for detecting a cell based on the captured signal energy;
code for integrating the received signal with a coherent integration parameter having a length of 128; and
code for integrating the received signal with a non-coherent integration parameter;
wherein the non-coherent integration parameter has a length of 36.

* * * * *